United States Patent [19]

Parks et al.

[11] Patent Number: 4,897,523

[45] Date of Patent: Jan. 30, 1990

[54] APPARATUS AND METHOD OF SHORT CIRCUITING ARC WELDING

[75] Inventors: John M. Parks, Solon; Elliott K. Stava, Brecksville, both of Ohio

[73] Assignee: The Lincoln Electric Company, Cleveland, Ohio

[21] Appl. No.: 310,022

[22] Filed: Feb. 10, 1989

Related U.S. Application Data

[63] Continuation of Ser. No. 135,832, Dec. 21, 1987, abandoned, which is a continuation-in-part of Ser. No. 940,580, Dec. 11, 1986, Pat. No. 4,717,807.

[51] Int. Cl.$^4$ .............................................. B23K 9/09
[52] U.S. Cl. ........................... 219/137 PS; 219/130.21
[58] Field of Search ...................... 219/130.21, 137 PS

[56] References Cited

U.S. PATENT DOCUMENTS

| | | | |
|---|---|---|---|
| 3,459,920 | 8/1969 | Sevenco | 219/130.21 |
| 3,792,225 | 2/1974 | Needham | 219/130.21 |
| 3,809,853 | 5/1974 | Manz | 219/137 PS |
| 4,020,320 | 4/1977 | Pijls | 219/137 PS |
| 4,544,826 | 10/1985 | Nakanishi et al. | 219/13 |
| 4,546,234 | 10/1985 | Ogasawara | 219/137 PS |
| 4,794,232 | 12/1988 | Kimbrough et al. | 219/130.51 |

FOREIGN PATENT DOCUMENTS

1565157  2/1970  Fed. Rep. of Germany .

OTHER PUBLICATIONS

Patent Abstracts of Japan, vol. 10, No. 83, (M-466), [2140], Apr. 2, 1986.
Patent Abstracts of Japan, vol. 9, No. 202, (M-405), [1925], Aug. 20, 1985.
Patent Abstracts of Japan, vol. 4, No. 161, (M-40), [643], Nov. 11, 1980.
Study of Welding Arc Control in China, by J. L. Pan, 231, Welding Journal, 65, (1986), Mar., No. 3, Miami, Fla., U.S.A.
A Power Source for Advanced Welding Systems, by P. Budai et al., First International Conference on Advanced Welding Systems, Nov. 1985.
A Power Source for Gas Shielded Arc Welding with New Current Wave Forms, by T. Ogasawara et al., First National Conference on Advanced Welding Systems, Nov. 1985.
Control of Short Circuiting in MIG Welding, P. Boughton et al., Welding Research International, 1974 Ed.

*Primary Examiner*—Clifford C. Shaw
*Attorney, Agent, or Firm*—Body, Vickers & Daniels

[57] ABSTRACT

In a short circuiting arc welding apparatus and method wherein a continuously fed welding wire alternates between an arcing condition during which the wire is spaced from the molten pool of the workpiece and a short circuit condition during which the melted metal on the end of the welding wire is in contact with the molten metal pool and thereafter transfers to the workpiece by a necking action breaking the melted metal from the wire, there is provided an improvement including providing a first high inductance current control circuit for continuously directing a low level, arc sustaining, background current between the welding wire and the workpiece and providing a second current control circuit for controlling current flow during the arcing condition of the process. This second current control circuit includes time delay means for causing the initiating arc at the start of the arcing condition to have an area determined primarily by the background current for a preselected time during which the molten metal on the tip of the welding wire and in the molten metal pool are drawn, by surface tension, to the wire and pool respectively, is essentially quelled and means for then passing a high current pulse through the arc between the wire and pool with a preselected energy for melting a relatively constant volume of metal on the end of the wire and spaced from the pool. This high energy pulse is near the start of the arcing condition and terminates generally before the mid-point of the arcing condition so that the wire is first melted and then driven into the molten metal pool after the pool has essentially quelled or become quiescent.

34 Claims, 6 Drawing Sheets $T_2 = 200 \, us \, (0.2 ms)$ $T_1 = 2.0 ms$ $a = .6 - .9d$ $x = 1.5d$
$(x > d, x < 2d)$ DIA. x AREA ≅ 18,000 Cal/Mol × VOLUME OF BALL

APPARATUS AND METHOD OF SHORT CIRCUITING ARC WELDING

This is a continuation of Ser. No. 135,832 filed Dec. 21, 1987 now abandoned which is a continuation-in-part application of prior copending application Ser. No. 940,580, filed Dec. 11, 1986, now U.S. Pat. No. 4,717,807. This prior copending application is incorporated by reference herein.

INCORPORATION BY REFERENCE

As background information, prior patents Sevenco 3,459,920, Needham 3,792,225, Pijls 4,020,320 and Ogasawara 4,546,234 are incorporated by reference herein.

BACKGROUND OF INVENTION

The present invention relates to the art of electric arc welding and more particularly to an apparatus and method for short circuiting arc welding.

Short circuiting arc type electric arc welding has been employed for many years; however, this type of welding, with its many advantages, has had substantial disadvantages. For instance, it has been limited to a relatively low rate of deposition. In addition, short circuiting arc welding has been capable of employing only a relatively low energy level and has produced non-uniform weld beads requiring post welding operations. In addition, the shielding gas used with short circuiting arc welding often required at least a portion of an expensive inert gas, such as Argon so that an electric pinch action can be employed for transferring molten metal from the driven welding wire to the molten metal pool during the short circuit stage or condition of the short circuiting arc welding process.

As the welding wire is fed toward the molten pool during the short circuiting arc welding process, the process alternates between a condition with the wire spaced from the weld pool with a gap separated by a plasma or arc, known as the arcing condition, and a condition with the welding wire touching the weld pool for the purpose of transferring molten metal from the electrode into the weld pool, known as the short circuit condition. In the past, these two conditions were natural phenomena created by using a constant voltage power supply and by driving or feeding the welding electrode toward the weld pool at a preselected feed rate. During the arcing condition, a ball of melted metal would be formed on the end of the advancing welding wire. When the ball grew to a sufficient size it would contact the weld pool causing a short circuit and initiating the short circuit condition of the welding process. Output characteristics of the power supply controlled the current flow during the arcing and short circuit conditions. Consequently, the size of the melted metal ball on the end of the advancing electrode or wire was determined by mechanical, electromagnetic and arc parameters which varied during successive cycles of the process. The size of the ball on the end of the wire was inconsistent and the resultant weld bead on the workpiece was not uniform. For that reason, the energy employed for short circuiting arc welding was relatively low so that a low total melting rate was obtained producing a low deposition rate during the total welding process.

Even with the various disadvantages and difficulties experienced in short circuiting arc welding, the industry has been anxious to develop this system for the purpose of high production welding; however, these efforts have been primarily thwarted by an preeminent disadvantage of short circuiting arc welding, i.e. high spatter associated with high energy arc alternating between short circuit conditions. Operators were aware of the spatter problem more than operational limitations on the process. Bead appearance was unsatisfactory and the welding tube became clogged by spattered metal. It is not surprising that these apparent limitations took precedent whereby the efforts in recent years to develop improved short circuiting arc welding apparatus and methods have been devoted primarily to the concept of reducing spatter. The reduction of spatter decreases the most obvious disadvantage of short circuiting arc electric welding as experienced by the operator; however, it did not allow higher deposition rates, large welding wires to produce a desired weld bead having a uniform appearance at high speed or really address more basic, yet less apparent limitations in prior attempts to improve short circuiting arc welding.

THE INVENTION

The present invention relates to an improvement in an apparatus and method for short circuiting arc electric welding which overcomes disadvantages of prior attempts to employ short-arc electric welding. These improvements give high deposition rates, allow use of large welding wires, allow high energy input to the process and produce a wide weld bead having a uniform, pleasing appearance. Further, in accordance with the present invention, the molten metal ball formed on the end of the welding wire as it is being driven toward the molten metal pool on the workpiece is essentially the same size during each successive cycle of the short circuiting arc welding process. These advantages and features are obtained in accordance with the present invention while retaining spatter control in a manner described in the prior copending application Ser. No. 940,590, filed Dec. 11, 1986 now U.S. Pat. No. 4,717,807.

In accordance with the present invention there is provided an improvement in a short circuiting arc welding apparatus comprising a single constant voltage D.C. power supply means for causing welding current to pass through a welding wire to a workpiece at a molten metal pool, wire feeding means for feeding the welding wire toward the workpiece at a controlled rate whereby the welding wire alternates between an arcing condition during which the wire is spaced from the pool of the workpiece but driven toward the pool and a short circuit condition during which melted metal on the end of the welding wire is in contact with the molten metal pool and then transfers to the workpiece by a necking action breaking the melted metal from the wire to initiate the arc in a subsequent arcing condition. The improvement in accordance with the present invention is the provision of a first high inductance current control circuit for continuously directing a low level, arc sustaining, background current between the welding wire and the workpiece and a second current control circuit for controlling current flow during the arcing condition, this second current control circuit includes time delay means for causing the initiated arc to have a low area determined by the background current for a preselected time $T_2$. During this time the molten metal remaining on the welding wire and in the pool is drawn by surface tension to the wire and pool respectively increasing the conductive cross section so the plasma boost may be applied without causing spatter. The plasma boost pulse is created by the second current control circuit means for then passing a high current pulse through the arc with a preselected I(t) area or energy for melting a relatively constant volume of metal on the end of the wire and spaced from the pool. In accordance with the invention, the energy created during the plasma boost is sufficient to create a spherical metal ball having a diameter no more than twice the diameter of the welding wire. The high current pulse is in the first portion of the arcing condition cycle so that the second portion of the arcing condition cycle is at the high inductance, low background current level whereby the advancing welding wire is first melted by the high current or high energy pulse or plasma boost and the pool is then allowed to become quiescent before the ball is fed into the pool.

By providing a high energy burst or boost after a preselected time delay and during the initial portion of the arcing condition, melting occurs only by the high energy pulse and not by background current. In this manner, the same amount of energy is introduced into the wire for the purpose of melting a preselected amount of wire during each arcing condition. The melting of the end of the wire is accomplished during the plasma boost condition. The melted wire is supported by the high jet forces of the arc during the plasma boost until termination of the plasma boost when, at the low background current, it is allowed to form into a sphere that provides the most efficient shape at the time of contact between the pool and wire. In the past, current immediately increased and was maintained relatively high during the total arcing condition so that melting occurs continuously. Melting is not done rapidly and allowed to settle before the short circuit. Indeed, melting in some of the prior systems continues even during the short circuit condition. By employing the present invention, the melting is accomplished and the ball is formed prior to being lowered into the molten metal pool at a low background current level. The background current can be as low as about 20 amperes. Preferably, it is in the range of about 20–80 amperes and is primarily selected just above the level necessary for maintaining the arc. By employing high inductance in the background current circuit, the current level can be further reduced and still assure maintenance of the arc during the last portion of the arcing condition and at the break caused by the necking action which terminates the short circuit condition. By employing this new concept, the dynamics of the molten weld pool are controlled whereas prior systems were primarily directed toward the concept of spatter control. Controlling the dynamics of the molten weld pool overcomes the disadvantages mentioned above, as well as controlling spatter in accordance with the concepts set forth in the prior copending application incorporated by reference herein.

In accordance with another aspect of the present invention there is provided a metal transfer current control circuit for controlling current flow during the short circuit condition of the short circuiting arc welding process wherein the metal transfer current control circuit includes a timing means for maintaining the low level background current until the molten metal of the welding wire is primarily transferred into the molten metal pool of the workpiece by surface tension action and means for thereafter applying a high current pinch pulse across the shorted melted metal. A detector means disconnects the pinch pulse in response to an anticipation of the impending breaking of the melted metal from the wire to start the arcing condition of the process.

By providing both aspects of the present invention in a short circuiting arc welding process, spatter is controlled while the melted ball has a preselected and consistent volume before being driven into the molten metal pool. The dynamics of the molten metal pool are such that a uniform, wide weld bead is obtainable.

In accordance with another aspect of the invention, a method of short circuiting arc welding is provided by using the apparatus discussed above.

The above-identified invention is not taught by Sevenco 3,459,920 which relates to injection of a pulse during the arcing condition for the alleged purpose of preheating and melting the work in preparation for a subsequent period of welding in a manner which does not affect the formulation of the droplet in any way. The present invention is related specifically to the concept of employing a plasma boost or pulse of a known energy for the purpose of completing the melting preparatory to feeding the molten metal ball to the molten pool so that an insertion and transfer of molten metal between the welding wire and molten metal pool is during a quiescent period for the molten metal pool. In Sevenco the wire is melted during the shorting condition. In the past, as set forth in this particular prior art patent, the use of high induction as anticipated by the present invention for the background current caused creation of an arc which preheated and melted the tip of the wire before the short circuit. This was avoided by the alleged concept set forth in Sevenco which has no application to the molten metal pool dynamic control of the present invention.

One attempt to control the dynamics of the pool is found in Pijls 4,020,320 which employs both a current source and voltage source power supply and involves the concept of extinguishing the arc during the arcing condition to destabilize the short circuiting arc welding process.

In Ogasawara 4,546,234, a short circuiting arc control is illustrated wherein a high energy pulse occurs immediately upon fracture of the neck to start the arcing condition of the process. By employing this prior concept, high current is applied to the process during the most unstable portion of the process, i.e. at the rupture of the short and immediate reionization of the arc or plasma. In addition, this process employs a high level current for the purpose of transferring metal by the electric pinch action as opposed to surface tension as anticipated by the present invention.

The present invention, as described above, involves substantial improvements over one or more of the prior art patents set forth above by approaching control of the short circuiting arc welding process from the molten metal pool dynamics instead of directing the process control to spatter control concepts. The invention uses a background current provided by high impedance current control circuit at the output of the constant voltage power supply. In this manner, the constant current control features which must be tuned precisely in Ogasawara 4,546,234 are not needed. In accordance with the present invention the desired pool dynamics and spatter control are obtained without such precise optimization of conflicting parameters. The feed rate may be adjusted to prevent sticking or the high energy melting pulse may be adjusted from the energy standpoint to accommodate a desired deposition rate with a known feed rate without the complexities created by attempting to control the system in accordance with theoretical concepts set forth in the prior art.

In accordance with another aspect of the invention, there is provided a short circuit welding apparatus comprising a single constant voltage d.c. power supply for causing welding current to pass through the welding wire to the workpiece at a molten metal pool wherein there is included a first high inductance current control circuit for continuously directing a low level, arc sustaining, background current in the range of about 20-80 amperes between the welding wire and workpiece during both the short circuit and arc conditions. A second, low inductance control circuit for controlling current flow above said background current level during the arcing condition and a third low inductance current control circuit for controlling current above the background current level during the short circuit condition. These separate control circuits for a single power supply provide flexibility to control both spatter and the weld pool dynamics without adapting the separate power supply concept of Needham 3,792,225.

The primary object of the present invention is the provision of a method and apparatus for short circuiting arc welding which method and apparatus reduces the turbulence of the molten metal pool or puddle, transfers from the arc or plasma condition to the short circuit condition at low energy and provides uniformity of operation.

Yet another object of the present invention is the provision of a method and apparatus, as defined above, which method and apparatus provides adequate control to assure that the ball on the end of the advancing wire during the arcing condition is substantially the same and created by a preselected energy input to assure a small uniform ball and a uniform, pleasing weld bead appearance.

Still a further object of the present invention is the provision of a method and apparatus, as defined above, which method and apparatus allows a high deposition rate by allowing larger welding wire and controlled increased energy to provide a weld bead substantially greater than the diameter of the welding wire without creating high turbulence in the molten metal pool into which the weld metal is transferred.

Yet a further object of the present invention is the provision of a method and apparatus as defined above, which method and apparatus transfers the metal from the electrode or welding wire into the molten metal pool primarily by surface tension action.

Another object of the present invention is the provision of a method and apparatus as defined above, which method and apparatus can be used with a variety of shielding gases, including carbon dioxide.

Another object of the present invention is the provision of a method and apparatus as defined above, which method and apparatus forces the melted ball to assume its natural spherical shape and then moves this ball into the weld bead while only a small arcing current is flowing.

Another object of the present invention is the provision of a method and apparatus, as defined above, which method and apparatus not only controls turbulence of the molten metal pool into which the metal is transferred but also results in reduced spatter.

These and other objects and advantages will become apparent from the following description taken together with the drawings as described below.

PREFERRED EMBODIMENT

Figure 1:
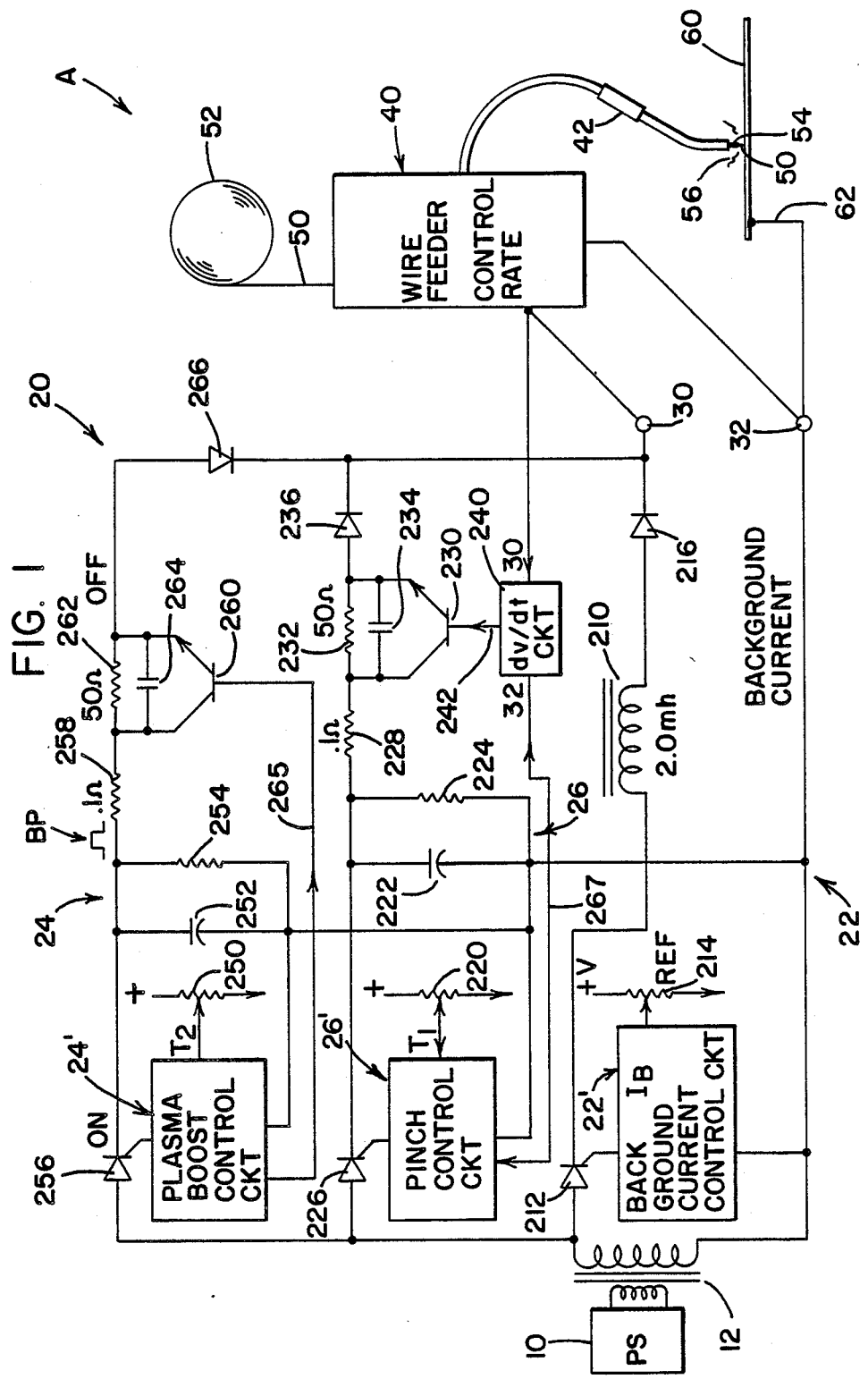
FIG. 1 is a schematic diagram illustrating the current control circuit employed for a single power supply in accordance with the preferred embodiment of the present invention.

Referring now to the drawings wherein the showings are for the purpose of illustrating a preferred embodiment of the invention only and not for the purpose of limiting same, FIG. 1 illustrates three separate current control circuits employed in a short circuiting arc welding system of the general type disclosed in prior application Ser. No. 940,580, filed Dec. 11, 1986. The short circuiting arc welding apparatus A includes a constant potential power supply 10 feeding transformer 12 that directs currents through a plurality of current control network 20 in a current control network to output terminals 30, 32. In accordance with the present invention, current control network 20 includes a first high inductance background current circuit 22 for continuously directing a relatively low background current with high inductive reactance across terminals 30, 32. A second current control circuit 24 directs additional current across terminals 30, 32 during the arcing condition of the short-arc welding process performed by apparatus A. This second current control circuit produces a plasma boost or current pulse having a preselected energy level and positioned near the front of the arcing condition. A third current control circuit 26 controls additional current across terminals 30, 32 during the short circuit condition of the short circuiting arc process performed by apparatus A in accordance with the present invention. In accordance with standard practice, a welding wire feeder 40 moves welding wire 50 through a contact tube 42 from a spool or other wire supply 52 at a constant controlled rate through an extension 54 toward workpiece 60 onto which molten metal is to be deposited. An appropriate shielding gas 56, which in the preferred embodiment is carbon dioxide, flows from tube 42 around wire extension 54 for the purpose of shielding the short circuiting arc welding process in accordance with standard practice. Workpiece 60 is steel, like wire 50, and is grounded by being connected to output terminal 32 of current control network 20. Of course, wire feeder 40 includes an arrangement for controlling the feed rate of wire 50 through tube 42 as well as appropriate circuitry which is well known in the art and forms no part of the present invention.

Figure 2:
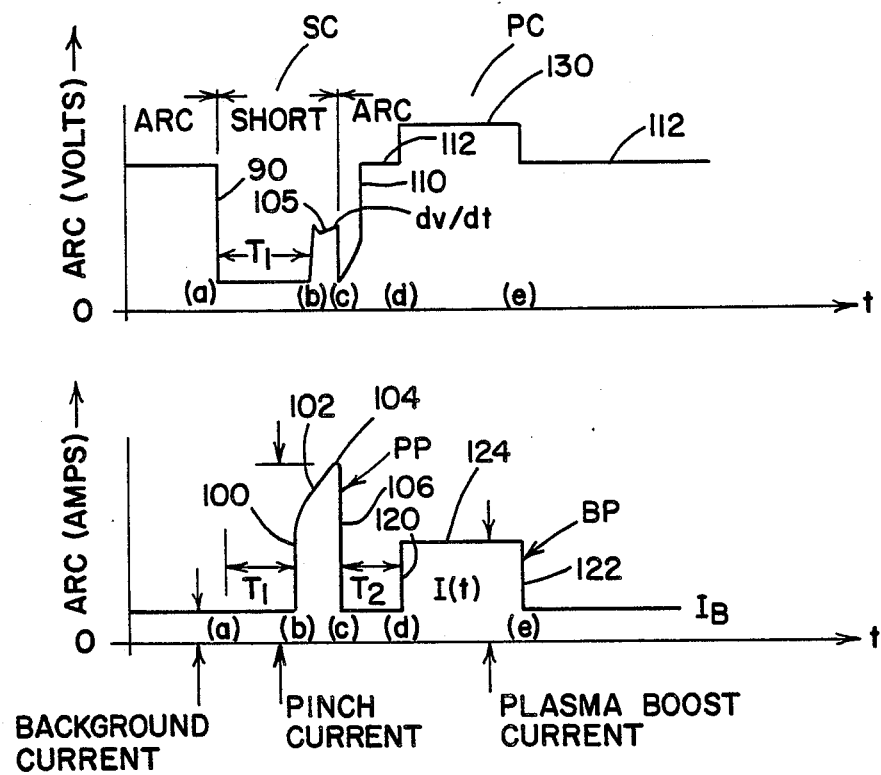
FIG. 2 are upper and lower graphs illustrating schematically the arc or plasma voltage from a constant potential power supply and the welding current controlled in accordance with the preferred embodiment of the present invention.

Referring now to FIG. 2, circuits 22, 24 and 26 of network 20 are operated to control the welding current as set forth in the lower graph. The upper graph illustrates the theoretical voltage across terminals 30, 32 as the circuits of network 20 control the short circuiting arc welding process to obtain the theoretical current characteristics schematically illustrated in the lower graph. Short circuiting arc welding involves continuously feeding welding wire 50 through extension 54 while shielded by gas 56 into a molten metal pool on workpiece 60 in a process alternating between a short circuit condition with the wire in electrical contact with the molten metal pool and an arcing condition with the welding wire spaced from the molten metal pool and being bridged by a plasma or arc. The arc condition PC and short circuit condition SC in this process are illustrated in FIG. 2. As soon as the welding wire touches the molten metal pool of workpiece 60, the arc voltage drops rapidly along vertical line 90 at position (a) to initiate the short circuit condition SC controlled by circuit 26 of network 20 shown in FIG. 1. For a time period $T_1$ between position (a) and position (b) molten metal is transferred from the end of wire 50 to the molten metal pool on workpiece 60 by surface tension action and the action of gravity in a down-hand operating mode. At position (b) the metal has been substantially transferred to the molten metal pool and a necking action has started. At that time, a pinch pulse PP is created by circuit 26 and applied across terminals 30, 32 in addition to the constantly applied background current provided by circuit 22. This pinch pulse is free to assume the short circuit current level which progresses along vertical line 100, over line 102 affected by a change in resistance of the neck to a position 104 wherein the voltage level 105 indicates an impending fuse of the neck. The change in voltage may be detected by a change in the sign of dv/dt to indicate the impending fuse caused by the abrupt pinching action of pulse PP. The voltage to level 105 progresses until a change in sign is produced by a dv/dt detector indicating the impending fuse which immediately removes current from circuit 26 from terminals 30, 32. Consequently, the pinch pulse PP is abruptly terminated along line 106 before separation of the fuse caused by the electric pinch action on the molten metal forming a short circuit bridge between welding wire 50 and workpiece 60 at the end of short condition SC. The abrupt drop in current along line 106 immediately before the pinching action breaks the short circuit prevents spatter caused by the presence of high energy at the time of the fuse explosion. This current reduction at position (c) initiates the arcing condition or plasma condition PC immediately following the short circuit condition SC, as shown in FIG. 2.

The arcing condition is initiated with only the high inductance background current $I_B$ flowing between the welding wire and the workpiece. Consequently, the arc initially formed has a very low current flow and substantially only a small arc area so that the puddling effect at the molten metal pool is minor. Consequently, the molten metal is essentially quelled with the current at a low level at the start of the arcing condition. The high inductance of circuit 22 assures arc continuity and ionization of the gap between the moving welding wire and the fixed workpiece as soon as a fuse explodes. As the two sections of molten metal are drawn by surface tension toward the tip of the wire and the molten pool during the time delay $T_2$ between positions (c), (d), the voltage across terminals 30, 32 is progressing along line 110 to an upper level 112 which is the steady state, equilibrium condition created by the continuously operated background current circuit 22 and the power supply 10. Between positions (c), (d) the molten metal of the weld pool becomes quiescent. Time $T_2$, is at least about 5% of the total process cycle including the arcing condition and shorting condition. In practice, this time is approximately 0.20 ms which is sufficient for stabilization of both the metal on the wire and the pool. Upon the expiration of the stabilizing time $T_2$, plasma boost circuit 24 directs a high current boost pulse BP into the weld operation across terminals 30, 32. Since this circuit has a low inductance, the pulse has an abrupt leading edge 120 and an abrupt trailing edge 122 with an upper level 124 to produce a metal melting energy in the welding process, which energy is controlled by the area I(t) of the high energy boost pulse BP. This energy is applied rapidly and has a value to create a preselected ball size no greater in diameter than about twice the diameter of the welding wire. The voltage across terminals 30, 32 increases naturally to a level 130 during plasma boost pulse BP in accordance with standard characteristics of a constant potential type power supply. Immediately following the boost pulse applied across terminals 30, 32, the welding current is shifted back to the background current level $I_B$. Consequently, further melting of wire 50 does not take place since the $I^2R$ necessary for melting the metal of the wire is not obtainable through an arc carrying only the background current which only serves to maintain the arc and the ball of metal in the molten state.

In accordance with the invention, pulse BP creates the melting effect after the time $T_2$. Thus, the melting at the end of the welding wire by pulse BP produces a preselected volume of molten metal on the end of the wire and then terminates melting for the rest of the arcing condition. After pulse BP is terminated only the background current flows to assure that surface tension is allowed to form the molten wire into a sphere and the weld pool is quelled. The molten metal ball is lowered into the weld pool by wire feeder 40. As the end of wire 50 is melted, jet forces of boost pulse BP repel the melted metal from the pool until the preselected amount of metal has been melted. Then the current is reduced allowing the molten metal to form into a ball and the pool is stabilized preparing for a smooth contact between the spherical ball and the quelled pool. Between position (e) and the subsequent short position (a) a low current flows so that there is not mechanical and electro-magnetic action between the pool and ball as it is being progressed toward the molten metal pool at the latter part of arcing condition PS.

Figure 4A:
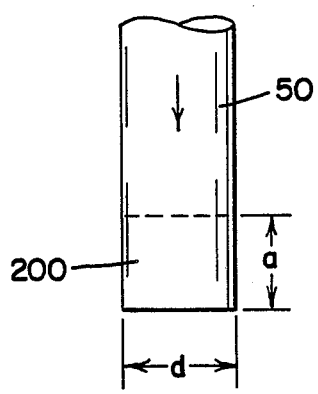
FIGS. 4A and 4B are partial drawings of the end of a welding wire which is melted in accordance with the present invention preparatory to being advanced into a molten metal pool and containing dimensions to explain a certain aspect of energy applied by the present invention.
Figure 4B:
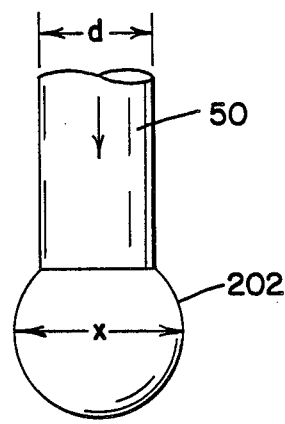
Figure 4C:
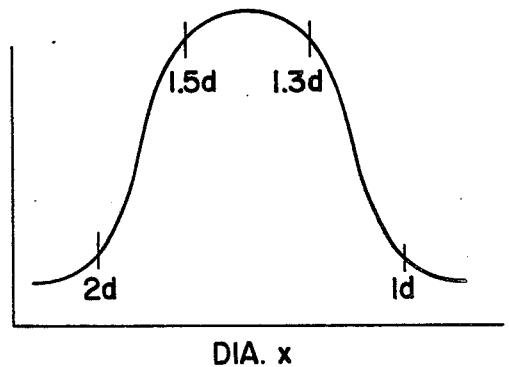
FIG. 4C is a distribution curve showing the distribution of acceptability for ball sizes in accordance with the dimensional aspects illustrated in FIGS. 4A, 4B.

Referring now to FIGS. 4A, 4B, high energy melting pulse BP has a controlled energy selected to melt a given portion 200 on rod 50 as shown in FIG. 4A. $I^2R$ heating during the plasma boost portion of the arcing condition melts a selected portion a from the end of wire 50 as the wire is moving toward the molten metal pool during the arcing condition. The high current is selected so that the $I^2R$ heating at the end of wire 50 combined with the high radiation heat caused by the drastic increase in the area of the arc is sufficient to melt only a small portion 200 from the end of wire 50. In practice, the melted end or portion 200 has a length which is about $0.6$–$0.9 \times$ diameter d of the wire. This produces a molten metal ball 202 being generally spherical in shape after it has stabilized under the influence of surface tension after pulse BP. The ball has a diameter generally in the neighborhood of 1.5 times the diameter of wire 50. Since the same energy is applied to the end of the wire each time, melted end portion 200 is obtained by the same current flow and the same radiant arc heat which combine to melt a selected volume to ultimately form the same size ball 202 during each plasma boost of the arcing condition. FIG. 4C indicates that the diameter x of ball 202 is between a lower limit equal to the diameter d and an upper limit equal generally to twice the diameter d. For each particular setting, the ball has the same size from cycle to cycle with the distribution curve of FIG. 4C illustrating generally the distribution of acceptability of the diameter x in a short circuiting arc process. As soon as the boost pulse BP is removed, only the background current passes through wire 50 and the area of the arc is drastically reduced since arc area is dependent upon arc current. Consequently, the combined $I^2R$ heating together with the arc heating is not sufficient to melt more metal from the end of wire 50.

Ball 202 is formed during the boost pulse only and it is then forced into the metal pool by feeding welding wire 50 into the pool. This melting action takes place at the boost portion of the arcing condition or plasma condition PC so that the time base (t) of the pulse BP is sufficiently short to allow for the melted metal on the end of the wire to have time, after pulse BP, to form into a sphere at a distance spaced from the molten pool allowing the sphere to form without contact with the pool. Then the formed ball can be lowered into the pool to terminate the plasma condition PC. This time is less than 50% of the arcing condition time and is terminated before 60% of the arcing condition has expired so that the wire is melted by the high current pulse and the pool can be quelled or become quiescent before melted ball 202 is moved into the pool while under the influence of a relatively small arc area sustained by background current $I_B$. Indeed, the time base length of the boost pulse is generally less than 50% and preferably less than about 30% of the arcing condition which will be more apparent from a review of a practical application or example of the invention shown in FIG. 3. The time $T_2$ is at least 5% of the time necessary for the total short condition and arcing condition. In practice, this time is approximately 0.20 ms. As can be seen, the molten metal on the wire and in the pool, in accordance with the invention, reaches equilibrium and is quiescent between position (c) and position (d) which are set forth as time $T_2$. Thereafter, a high energy pulse causing a large area plasma arc and high current flow through wire 50 melts a selected portion at the end of the wire by the combined heating action of the current flow and the heat of the plasma or arc. After this melting, a substantial time between position (e) and position (a) allows the melted wire to form ball 202 and be moved into the molten metal pool while the pool is subjected to relatively low arc forces. In this manner, the ball is the same size during each cycle and shorting is assured since there is no turbulence caused by large arc current to bounce the ball away from the molten metal pool as it engages the pool. There is no subsequent energy available for melting wire 50; therefore, the wire ultimately drives melted, formed metal ball 202 into the pool to create a short circuit condition at position (a).

During shorting condition SC, the melted metal ball 202 engages the molten metal pool and is transferred into the pool by surface tension. This action causes an ultimate necking down of the molten metal extending between the pool and wire 50 and then a rupture and separation of ball 202 from wire 50 as shown in FIG. 5E. Since there is a low background current, this separation or fuse will have low energy and cause little if any spatter. Since surface tension may require different times to neck and break ball 202 from wire 50, in accordance with one aspect of the invention, pinch pulse PP between positions (b), (c) is applied by circuit 26 at the end of the short circuit condition. This pinching action is allowed to progress naturally by the parameters of the power supply and circuit 26; therefore, as soon as the control circuit is activated, the current shifts upwardly along line 100. Thereafter, as the neck rapidly reduces in diameter by electric pinch, the current flow increases more gradually until a detection of an impending fuse is obtained by the dv/dt at voltage level 105. As can be seen, the energy introduced into the process is relatively low since the voltage rises only slightly and pulse PP is relatively short in time. This pulse is for electric pinching action to terminate at a preselected time the short circuit condition by pinching off the metal of ball 202 after surface tension transfer is essentially completed during the time $T_1$. $T_1$ is at least about 10% of the total combined cycle for shorting and arcing and is generally in excess of 1.5 ms. This is compared to a $T_2$ time of approximately 0.2 ms. The difference in the relative timing is that time $T_1$ is relatively long to allow for primary transfer of the molten metal by the slower surface tension action and/or by gravity if applicable. The time $T_2$ allows for the molten metal on the wire and the molten metal of the pool to settle immediately after a fuse break, as shown generally in FIG. 5F, so that boost pulse BP is not applied with free molten metal in a stalactite/stalagmite formation at the instant of a fuse explosion, as shown in FIG. 5E. This allows the molten metal to achieve a cross section capable of carrying the boost current. The end of wire 50 and the pool into which the metal is transferred draw toward each other in a very short period of time following the fuse, which surface tension action is allowed by the delay $T_2$. A high current pulse while metal is extending in the gap is a source of spatter generally ignored in short circuiting arc welding.

CURRENT CIRCUIT NETWORK

Referring again to FIG. 1 a variety of current circuits could be provided for the purpose of accomplishing the present invention as set forth above; however, in accordance with the illustrated preferred embodiment of the invention current circuit network 20 includes three separate and distinct current control circuits each of which performs a current control function directing current from the output of the constant potential power supply 10 to the welding operation across output terminals 30, 32. These circuits are current additive in nature and include a constantly operated high inductance background current control circuit 22 having a tremendously large inductor 210 to maintain a current with high inductive reactance but at a low level such as 20 amperes or slightly less. In the illustrated embodiment, inductor 210 has an inductance of 2.0 mh. The background current control circuit is operative by actuating power transistor 212 in response to starting circuitry of any type and is controlled by circuit 22′ so that the magnitude of the current is controlled by inductor 210 and is adjusted by potentiometer 214. Circuit 22 directs current continuously through blocking diode 216 to the wire and workpiece. In this manner, background current IB flows continuously and sustains the arc during all arc situations.

Pinch control circuit 26′ of the pinch circuit 26 is operative during the short circuit condition and includes a resistor 220 which is an adjustable pot which can be adjusted to change the current level of current applied through transistor 226. Time $T_1$ is controlled by circuit 26′. Capacitor 222 balances the inductive reactance of transistor 12 for this particular circuit. Resistor 224 acts as a filter for current from power transistor 226 which causes current flow through resistor 228. In this manner, transistor 226 is actuated after the time $T_1$ to turn on the pinch current at the end of short condition SC. The pinch control circuit is actuated by an appropriate voltage sensing or detecting arrangement indicating the instant when the welding voltage plunges from the plasma level to the short circuit level. This can be accomplished by a detector 240 as indicated by line 267 or by other appropriate voltage sensing circuits. After time $T_1$, power switch or transistor 226 is closed by control 26′ to actuate circuit 26 to direct current flow through current limiting resistor 228. A Darlington connected transistor switch 230 is closed by control 26′ by logic in line 242 in response to a signal in line 267 and passes resistor 232 and parallel capacitor 234 for the purpose of allowing the pinch pulse PP to pass through blocking diode 236. Detector 240 has a dv/dt sensor to open switch 230 after the switch has been closed by the pinch control circuit 26 following time $T_1$. In this manner, the pinch control circuit 26′ initiates switch 226 after time $T_1$ and switch 230 places resistor 232 in series with resistor 228 to terminate the pinch pulse. Thereafter, this circuit becomes inactive until the next short detected by a sudden drop in plasma voltage.

The plasma boost current control circuit 24 is similar to pinch control circuit 26 and includes an adjustable potentiometer 250 for controlling current level. Time $T_2$ is set in control 24′. Capacitor 252 balances the inductance of the power supply and is combined with filter resistor 254 for the purpose of producing an energy pulse BP indicated above the circuit. When power switch or transistor 256 is closed by the plasma boost control circuit the leading edge of the pulse is formed. This high energy boost pulse BP passes through resistor 258. A Darlington connected power switch 260 is conductive to pass pulse BP. Switch 260 is in parallel with resistor 262 and capacitor 264 to stop the high energy boost pulse upon receipt of a signal through line 265 to form the trailing edge of the pulse. Blocking diode 266 directs the current from circuit 24 across terminals 30, 32. In summary, after time $T_2$, transistor switch 256 is turned on. This creates the leading edge of the boost pulse BP. At the same time, switch 260 is on to pass the boost pulse through diode 260. To terminate the boost pulse, a signal in line 265 deactivates switch 260 inserting resistor 262 having a resistance of 50 ohms into the output circuit. This immediately terminates the pulse and creates the trailing edge of the plasma boost or boost pulse BP. In this manner, the pulse has a relatively rectangular shape as shown in the lower portion of FIG. 2 and schematically in dashed lines in FIG. 8.

As background for the introduction of three separate currents across the welding circuit for short circuiting arc welding, Needham 3,792,227 is incorporated by reference herein. This patent employs separate power supplies and does not have the pinch pulse and boost pulse forming the essence of the present invention.

EXAMPLE

Figure 3:
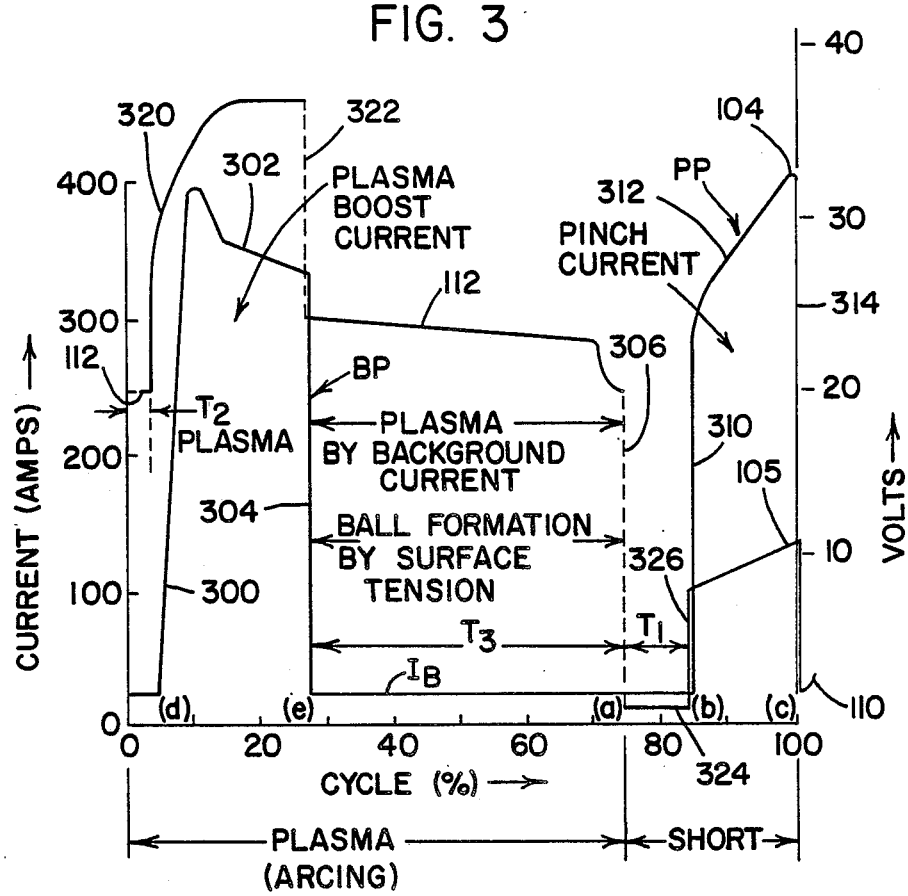
FIG. 3 is a combined arc voltage and welding current graph similar to the graphs shown in FIG. 2 but taken from a specific example of the present invention as set forth in the parameters at the lower portion of FIG. 3.

Referring now to FIG. 3, a specific example of a short circuiting arc process employing the present invention is illustrated showing the welding current at the various stages and the resulting voltage levels. After time $T_2$ during which the voltage is at the normal stabilized plasma level 112, pulse BP is created. This increases the current along line 300 to approximately 400 amperes at which time the end of wire 50 starts melting causing the current to droop along line 302 until switch 260 of FIG. 2 is opened. Booster energy pulse BP is then abruptly terminated, as indicated by trailing edge 306 of the boost pulse. This reduces the current down to the background level of $I_B$. At that time, the voltage is controlled by the background current which has substantial inductance; therefore, plasma level 112 droops along the line indicated by time $T_3$. This time is the remainder of the arcing condition after the end of the melting pulse. During this time, the background current from circuit 22 is controlled by the power supply so that there is very little arc area and this area is only sufficient to sustain the arc so that the pool can physically stabilize during the latter part of the arcing condition. As soon as the melted metal ball formed on the end of the wire engages the molten pool, the voltage immediately plunges along line 306 caused by the short circuit. The current remains at the background level and is held at this level for a substantial period of time such as approximately 1.5-2.0 ms. Thereafter, transistor 226 of circuit 26 is closed while switch 230 is also closed. This introduces a pinch pulse PP by increasing the welding current along line 310. As the current reaches the upper end of line 310, the voltage commences to change more gradually since the resistance of the decreasing neck is increasing during pinch. This causes the current to shift more gradually toward the position 104 just before the electric pinch cause the fuse to explode. Before the fuse, current 314 is plunged back to background current level to reduce the energy of the fuse explosion. This is accomplished by opening switch 230 by detector 240 shown in FIG. 1. When that happens, the voltage is stabilized along line 110 to the level 112 which is held during the arcing condition for time $T_2$. Thereafter, the current boost pulse is repeated. The parameters of this particular example are set forth in the lower portion of FIG. 3.

PLASMA BOOST AND POOL DYNAMICS

Figure 5A:
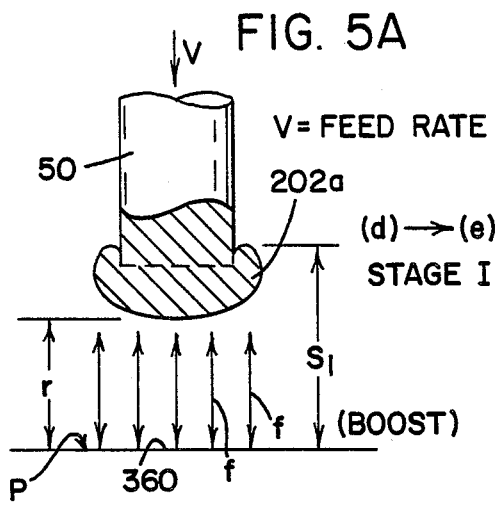
FIGS. 5A-5F are schematic illustrations of the advancing welding wire as it progresses through various conditions when employing the preferred embodiment of the present invention.
Figure 5B:
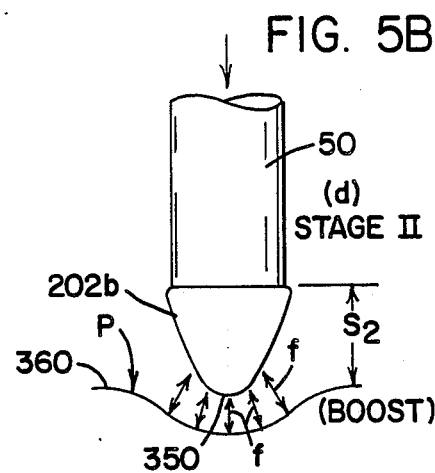
Figure 5C:
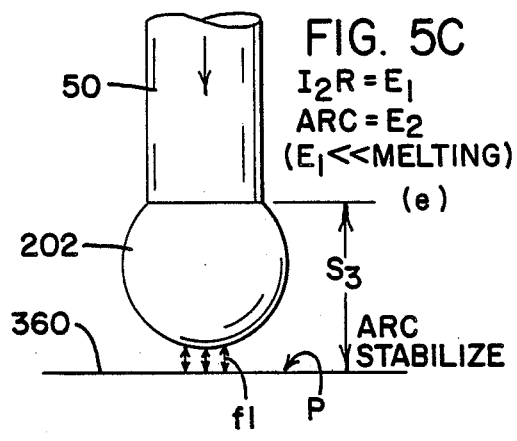
Figure 5D:
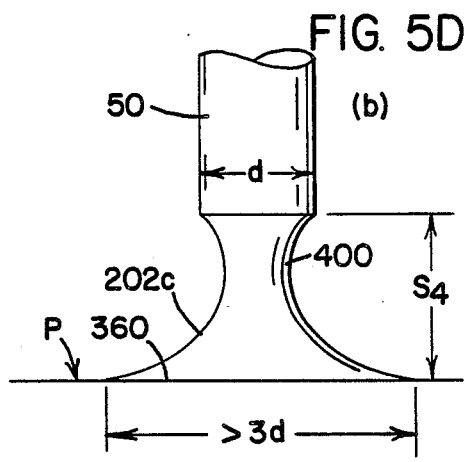
Figure 5E:
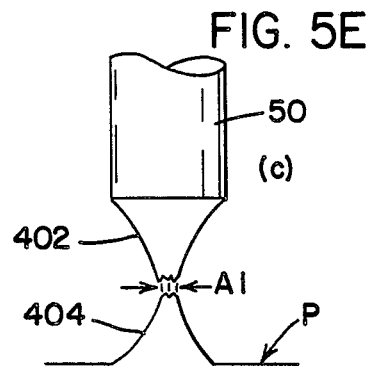
Figure 5F:
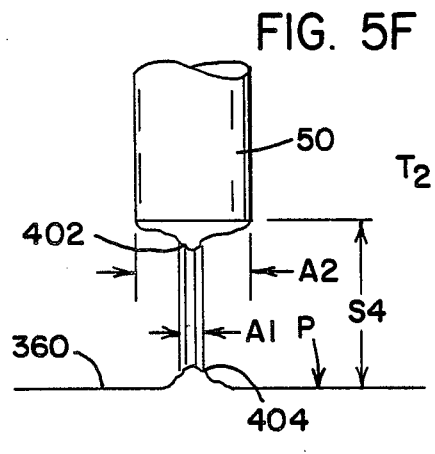

Referring now to FIGS. 5A–5F, operating characteristics of the present invention are schematically illustrated to show how the use of the present invention controls spatter and produces a wide weld bead at an increased deposition rate. When the arcing condition is created by separation of a fuse caused by the electric pinch pulse, only the background current flows for a short time $T_2$. Then the boost pulse is applied and wire 50 is melted and repelled from pool P as illustrated in FIG. 5A. This pulse easily melts the end of advancing welding wire 50 to produce a general toroidal melted metal mass 202a which is repelled from pool P a distance r by the use of jet forces set forth as several arrows f in FIG. 5A. These forces push mass 202 away from pool P so that the melted mass of metal 202a gathers around the unmelted end of wire 50 which is spaced from pool P in the distance $S_1$. The high energy electric plasma between the wire and pool causes the jet forces f to act on the pool as well as on mass 202a to hold the mass away from the pool as long as the plasma boost is applied. When Argon is used the mass can shift into a generally conical mass 202b having an end 350 which may extend toward pool P to a level below the natural level 360 of the pool as shown in FIG. 5B. This shape is caused by electric pinch and forms during the later portion of the plasma boost. In this situation, pool P is forced outwardly by the arcing forces as schematically illustrated in FIG. 5B. The unmelted end of wire 50 is progressing toward pool P and is now at a lesser distance $S_2$. When the boost pulse is discontinued, surface tension forms mass 202b into a spherical ball as shown in FIG. 5C. When $CO_2$ is used there is no substantial electric pinch thus, when the high plasma boost current stops, the melted mass progresses from mass 202a shown in FIG. 5A to ball 202. Distance $S_3$ is such that when the pool becomes quiescent or generally flat, it does not contact melted metal ball 202 as the metal of the pool returns into the concave cavity caused by the high jet forces during the high energy pulse. These low arcing forces caused by only the background current no longer maintain the melted metal away from the pool and a gradual, positive shorting action occurs when wire 50 is lowered downward so that ball 202 contacts pool P. This is done while low jet forces are present so that there is no tendency to bounce and the energy in the plasma gap is insufficient to cause pool agitation during the shorting action. The time $T_1$ between the plasma boost or pulse BP and the short circuit is during the arcing condition and is sufficiently long to allow the ball to form and the pool to be quelled from the agitation of the high current flow. When the short occurs, the metal of ball 202 is transferred into the pool by surface tension as indicated by the configuration of the melted mass 202c in FIG. 5D. This is at position (b) where the electric pinch pulse PP starts. Mass 202c is forming a small diameter neck 400 as surface tension pulls the molten metal from the end of wire 50. As can be seen, with a quiescent pool P, the metal can move outwardly to produce a bead greater than three times the diameter of the wire 50. Consequently, a large weld bead can be created which will facilitate increased wire size and energy without causing spatter or weld bead irregularities. Melted metal 202c is transferred to the pool by surface tension and then an electric pinching action occurs. Before the pinching action ruptures neck 400, the welding current is reduced to the background level. This low current produces an arc having a small diameter A1 when the neck is ruptured as shown in FIG. 5E. The necking action at neck 400 has just ruptured; therefore, there is metal 402 extending from the end of wire 50 toward pool P. In a like manner, the pool portion of the neck creates molten metal 404. By employing a low background current having high inductance at the time of the fuse explosion, the energy used to reignite the arc is low to prevent spatter. In addition, the boost current is not applied so that the metal portion 402, 404 can, by surface tension, progress into their respective bases as shown in progress in FIG. 5F. During time T as shown in FIG. 5F, the molten metal 402 on the tip of wire 50 and metal 404 of pool P are drawn by surface tension to the wire and pool, respectively. When this is accomplished, the high energy plasma boost is applied which will increase the area of the plasma or arc as indicated by increased diameter A2 in FIG. 5F. As soon as the boost is applied, the steps set forth in FIGS. 5A–5F are repeated. As can be seen, the size of the ball is determined by the energy during the current boost at the start of the arcing condition. Thereafter, no more melting occurs and the weld pool is quelled. Transfer of metal is by the gradual surface tension action with only a minor assistance at the end of the shorting condition for an abrupt electrical pinch to break the neck positively and in a short time.

MODIFICATIONS

Figure 6:
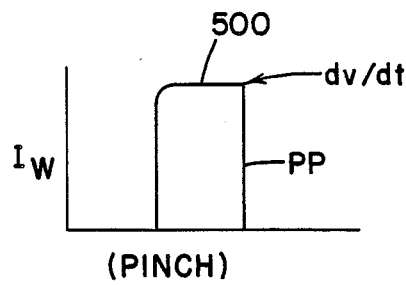
FIG. 6 is a welding current graph showing a high energy current pulse employed during the short circuit condition of the present invention and having a modified pulse configuration.

The preferred embodiment of the present invention is described in connection with FIGS. 1–5; however, certain modifications can be made without departing from the intended spirit and scope of the present invention. For instance, referring to FIG. 6, pinch pulse PP can be formed with a generally flat upper maximum level 500 by appropriate selection of parameters, i.e. resistance, in the pinch control circuit 26. In this manner, a constant current is applied at the end of the short circuit condition to effect the final electric pinch. This current is abruptly dropped to the background current level by a premonition circuit, such as a dv/dt detector 240.

Figure 7:
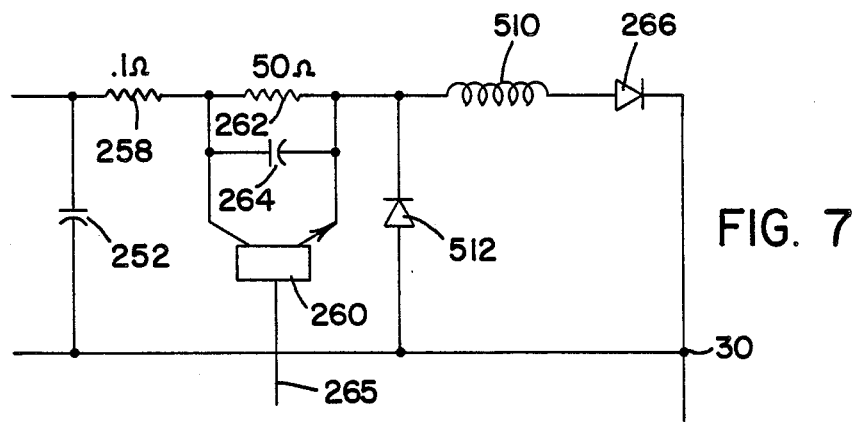
FIG. 7 is a modification of one aspect of the preferred embodiment of the present invention shown in FIG. 1 to produce an high energy pulse as shown in FIG. 8; and, FIG. 8 is a welding current graph showing the relative relationship of the current pulses created during the short circuit condition and subsequent arcing condition in accordance with the present invention together with two modifications of the arcing condition control circuit one of which employs the modification illustrated in FIG. 7.
Figure 8:
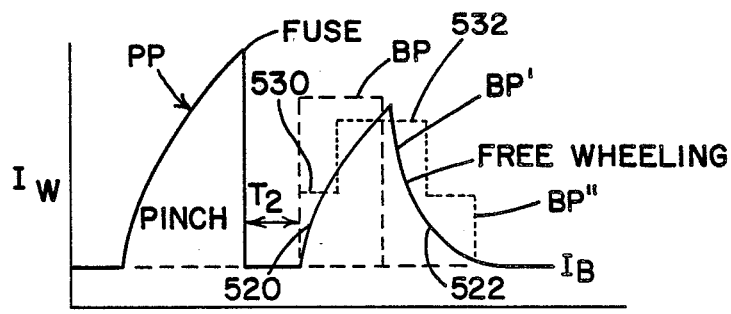

Referring now to FIG. 7, plasma boost control circuit 24 can be modified by incorporating an output inductor 510 and a freewheeling diode 512 so that the boost pulse is converted from the dashed line profile shown in FIG. 8 to the solid line profile. A high time constant leading edge 520 and a slowing decaying trailing edge 522 controlled by the freewheeling diode forms the pulse BP′ with the energy of pulse BP. Inductor 510 could be adjustable by employing a secondary with an adjustable pot to control the profile of leading edge 520. In either of the boost pulses, the total energy as determined by the integration of the profile is such to melt a selected portion of wire 50 during the pulse. Such melting, as mentioned before and as set forth in FIG. 5C, results from two heating sources the energy caused by $I^2R$ heating and the energy caused by the radiant arc heating. The current level is selected to that the $I^2R$ heating will not melt the end of the wire without the high energy accompanying the electric boost pulse so that melting occurs only on the end of wire 50 exposed to the arc. These heat sources combine to cause melting of a selected amount. As soon as the pulse is terminated, melting essentially stops. To select the energy, the area in the current boost pulse curves is such that approximately 18,000 calories per mole times the volume of ball 202 provides the total energy developed for the melting action. This energy value determines essentially the amount of metal in melted metal ball 202 after the high energy melting pulse has been terminated. This energy is the same in the boost pulse BP in the preferred embodiment of the invention as well as the boost pulse BP' obtained through use of the modification set forth in FIG. 7.

In accordance with still a further modification of the present invention, the boost pulse can take the profile shown as pulse BP" as a dotted line in FIG. 8. This pulse is created by a generally flat profile pulse having a level 530 combined with a second pulse having an upper current level 532 and a substantially reduced time base length. By combining these two subpulses into a boost pulse BP", melting is initiated by the heating effect of the current 530. The heating is then accelerated by the high level current 532. Some melting may occur when the current is shifted back to the elevated level 530. Thereafter, the melting is complete and the welding current drops to the background level for the remainder of the arcing condition to carry ball 202 into the molten metal pool P as set forth in FIG. 5D.

GENERAL DISCUSSION

By employing the present invention, transfer of molten metal is not dependent upon electric pinch; therefore, 100% carbon dioxide may be used as a shielding gas. By using the delay $T_1$, which is substantially greater than the delay of the copending application, there is no tendency to initiate the high current until there is a substantial contact between ball 202 and pool P. Indeed, this contact has progressed by surface tension to the place where the neck 400 has started.

A bead three times the size of the wire 50 can be accomplished by using the present invention. When the boost current or pulse is created, the jet forces f tend to repel metal 202a from pool P which has a tendency to keep the melted metal mass away from the pool during the melting action so that it is assured that the metal contact causing a short will not occur until substantially after the boost current has been removed and ball 202 has formed. The arc length must be more than half the diameter of the electrode when the boost is applied to melt the metal back away from the pool at the same time the pool is driven away from the area just below welding wire 50. Otherwise, electrical stubbing can occur. The boost pulse remains on a preselected time which causes a predetermined amount of metal to melt. In this manner when the boost is removed and the molten metal forms a sphere 202 due to surface tension, ball 202 remains above the pool until it is lowered into the pool at the wire feed rate controlled by wire feeder 40.

The plasma boost energy is only sufficient to melt a volume of wire equivalent to that indicated in FIG. 4B. If an excessive amount of wire is melted by the energy of the boost pulse, transfer of the ball is more difficult without spatter. For that reason, the energy of the boost pulse is controlled to obtain the parameters set forth in FIG. 4B.

Having thus defined the invention, the following is claimed:

1. In a short circuiting arc welding apparatus comprising a single constant voltage D.C. power supply means for causing a welding current to pass through a welding wire to a workpiece at a molten metal pool, wire feeding means for feeding said welding wire toward said workpiece at a controlled rate whereby said welding wire alternates between an arcing condition during which said wire is spaced from said pool of said workpiece but driven toward said pool and a short circuit condition during which melted metal on the end of said welding wire is in contact with said molten metal pool and then transfers to said workpiece by a necking action breaking said melted metal from said wire to initiate the arc in a subsequent arcing condition, the improvement comprising: a first high inductance current control circuit for continuously directing a low level, arc sustaining, background current between said welding wire and said workpiece and a second current control circuit for controlling current flow during said arcing condition, said second control circuit including time delay means for causing said initiated arc to have current flow determined primarily by said background current for a preselected time $T_2$ during which melted metal on the welding wire and the molten metal pool are essentially quelled and means for then passing a high current pulse through said arc between said wire and pool with a preselected energy for melting a relatively constant volume of metal on the end of said wire and spaced from said pool, said high current pulse being terminated before about 60% of said arcing condition has transpired whereby said wire is melted by said high current pulse and said pool is again essentially quelled before said wire is fed into said pool whereby only said background current is flowing through the arc when said short circuit condition is initiated by driving said electrode into said pool.

2. The improvement as defined in claim 1 wherein said high current pulse has a controlled duration and said arc condition has a duration with the duration of said current pulse being less than 30% of the duration of said arcing condition.

3. The improvement as defined in claim 1 wherein time $T_2$ is at least 5% of the time required for both said short condition and said arcing condition.

4. The improvement as defined in claim 1 wherein said second current control circuit includes means for adding current to said background current during said arcing condition and means for reducing said preselected energy of said high current pulse in inverse proportion to the amplitude of said added current.

5. The improvement as defined in claim 1 wherein said second current control circuit includes means for shaping said high current pulse into a pulse having a high time constant leading edge and a gradually decaying trailing edge.

6. The improvement as defined in claim 1 including a third current control circuit for controlling current flow during said short circuit condition, said third current control circuit including timing means for allowing flow of only said background current until said melted metal of said welding wire is primarily transferred into said molten pool by surface tension and means for thereafter applying a high current pinch pulse across said shorted melted metal and detector means for discontinuing said pinch pulse in response to an anticipation of impending breaking of said melted metal from said wire to start said arching condition.

7. The improvement as defined in claim 6 wherein said detector means includes means for detecting the dv/dt across said shorted melted metal and means for discontinuing said pinch pulse when the derivative dv/dt changes sign at the end of a short circuit condition only and where v is the voltage during the pinch pulse.

8. The improvement as defined in claim 7 wherein said third current control circuit includes a low inductance current output.

9. The improvement as defined in claim 6 wherein said third current control circuit includes a low inductance current output.

10. The improvement as defined in claim 9 wherein said second circuit control circuit includes a low inductance current output.

11. The improvement as defined in claim 6 wherein time base length of said current pulse is less than 30% of said arcing condition.

12. The improvement as defined in claim 6 wherein time $T_2$ is at least 5% of the time required for both said short condition and said arcing condition.

13. The improvement as defined in claim 1 wherein said second circuit control circuit includes a low inductance current output.

14. The improvement as defined in claim 1 wherein said wire has a given diameter and said volume is sufficient to form a sphere having a diameter no more than twice the diameter of said wire.

15. A method of short circuiting arc welding by a D.C. power supply for supplying welding current between a welding wire being fed at a controlled constant rate and the molten metal pool of workpiece toward which said wire is being fed, said method including a succession of short circuit conditions separated by arcing conditions, said method comprising the steps of:
  (a) providing a background current through said wire and pool during both of said short circuit conditions and said arcing conditions, said background current having a high inductance component and a low level just above the level necessary for sustaining an arc when said wire and pool are separated;
  (b) at the start of each of said arcing conditions, allowing said low background current to flow for a preselected time $T_2$ sufficient to allow said molten pool to be quelled;
  (c) after said pool is quelled, passing a high current pulse through said arc between said wire and said pool with a preselected I(t) area for melting a relatively constant volume of metal on the end of said wire and spaced from said pool;
  (d) allowing said low background current to flow after said high current pulse for the remainder of said arcing condition; and,
  (e) then feeding said wire with said volume of melted metal on its end into said molten metal pool to start the short circuit condition with an arc sustained by only said low background current.

16. The method as defined in claim 15 including the steps of detecting the end of a short circuit condition and starting said time $T_2$ in response to said detecting step.

17. The method as defined in claim 16 including the step of applying a high current pinch pulse at only the end of said short circuit condition until the melted metal is electrically pinched from said welding wire to terminate said short circuit condition and initiate said arcing condition.

18. The method as defined in claim 16 including the step of maintaining said background current at all times.

19. The method as defined in claim 15 including the step of maintaining said background current at all times.

20. The method as defined in claim 19 including the step of applying a high current pinch pulse at only the end of said short circuit condition until the melted metal is electrically pinched from said welding wire to terminate said short circuit condition and initiate said arcing condition.

21. The method as defined in claim 15 including the step of applying a high current pinch pulse at only the end of said short circuit condition until the melted metal is electrically pinched from said welding wire to terminate said short circuit condition and initiate said arcing condition.

22. The method as defined in claim 21 including the step of predicting the separation of said melted metal from said welding wire at the end of said short circuit condition and terminating said high current pinch pulse just before said predicting step.

23. In a short circuiting arc welding apparatus comprising a single constant voltage D.C. power supply means for causing a welding current to pass through a welding wire to a workpiece at a molten metal pool, wire feeding means for feeding said welding wire toward said workpiece at a controlled rate whereby said welding wire alternates between an arcing condition during which said wire is spaced from said pool of said workpiece but driven toward said pool and a short circuit condition during which melted metal on the end of said welding wire is in contact with said molten metal pool and then transfers to said workpiece by a necking action breaking said melted metal from said wire to initiate the arc in a subsequent arcing condition, the improvement comprising: a first high inductance current control circuit for continuously directing a low level, arc sustaining, background current in the range of about 20-80 amperes between said welding wire and said workpiece during both of said short circuit and arcing conditions, a second low inductance current control circuit for controlling current flow above said background current level during said arcing condition, and a third low inductance current control circuit for controlling current above said background current level during said short circuit condition.

24. In a short circuiting arc welding apparatus comprising a single constant voltage D.C. power supply means for causing a welding current to pass through a welding wire of a given diameter to a workpiece at a molten metal pool, wire feeding means for feeding said welding wire toward said workpiece at a controlled rate whereby said welding wire alternates between an arcing condition during which said wire is spaced from said pool of said workpiece but driven toward said pool and a short circuit condition during which melted metal on the end of said welding wire is in contact with said molten metal pool and then transfers to said workpiece by a necking action breaking said melted metal from said wire to initiate the arc in a subsequent arcing condition, the improvement comprising: a first high inductance current control circuit for continuously directing a low level, arc sustaining, background current between said welding wire and said workpiece and a second current control circuit for controlling current flow during said arcing condition, said second control circuit including time delay means for causing said initiated arc to have a current level determined by said background current for a preselected time $T_2$ during which melted metal on the welding wire and the molten metal pool are essentially quelled and means for then passing a high current pulse through said arc between said wire and pool with a preselected energy for melting a relatively constant volume of metal on the end of said wire and spaced from said pool, said volume being sufficient to form a sphere having a diameter no more than twice the diameter of said wire.

25. In a short circuiting arc welding apparatus comprising a D.C. power supply means for causing a welding current to pass through a welding wire to a workpiece at a molten metal pool, wire feeding means for feeding said welding wire toward said workpiece at a controlled rate whereby said welding wire alternates between an arcing condition during which said wire is spaced from said pool of said workpiece but driven toward said pool and a short circuit condition during which melted metal on the end of said welding wire is in contact with said molten metal pool and then transfers to said workpiece by a necking action breaking said melted metal from said wire to initiate the arc in a subsequent arcing condition, the improvement comprising: a current control circuit for providing a low level, arc sustaining, background current between said welding wire and said workpiece and a metal transfer current control circuit for controlling current flow during said short circuit condition, said metal transfer current control circuit including timing means for allowing only said background current to flow until said melted metal of said welding wire is primarily transferred into said molten pool by surface tension and means for thereafter allowing a high current pinch pulse to flow across said shorted melted metal and detector means for discontinuing said pinch pulse current in response to an anticipation of impending breaking of said melted metal from said wire to start said arcing condition.

26. In a short circuiting arc welding apparatus comprising a D.C. power supply means for causing a welding current to pass through a welding wire to a workpiece at a molten metal pool, wire feeding means for feeding said welding wire toward said workpiece at a controlled rate whereby said welding wire alternates between an arcing condition during which said wire is spaced from said pool of said workpiece but driven toward said pool and a short circuit condition during which melted metal on the end of said welding wire is in contact with said molten metal pool and then transfers to said workpiece by a necking action breaking said melted metal from said wire to initiate the arc in a subsequent arcing condition, the improvement comprising: a first high inductance current control circuit for continuously direction a low level, arc sustaining, background current between said welding wire and said workpiece; a metal transfer current control circuit for controlling current flow during said short circuit condition; and a plasma boost control circuit for controlling current flow during said arcing condition, said plasma boost control circuit including means for passing a high current pulse through said arc between said wire and pool with a preselected energy for melting a relatively constant volume of metal on the end of said wire and spaced from said pool and means for delaying said high current pulse for a preselected time after said short circuit condition.

27. In a short circuiting arc welding apparatus comprising a single constant voltage D.C. power supply means for causing a welding current to pass through a welding wire to a workpiece at a molten metal pool, wire feeding means for feeding said welding wire toward said workpiece at a controlled rate whereby said welding wire alternates between an arcing condition during which said wire is spaced from said pool of said workpiece but driven toward said pool and a short circuit condition during which melted metal on the end of said welding wire is in contact with said molten metal pool and then transfers to said workpiece by a necking action breaking said melted metal from said wire to initiate the arc in a subsequent arcing condition, the improvement comprising: a first current control circuit for continuously directing a low level, arc sustaining, background current between said welding wire and said workpiece and a second current control circuit for controlling current flow during said arcing condition, said second control circuit including time delay means for causing said initiated arc to have current flow determined primarily by said background current for a preselected time $T_2$ during which melted metal on the welding wire and the molten metal pool are essentially quelled and means for then passing a high current pulse through said arc between said wire and pool with a preselected energy for melting a relatively constant volume of metal on the end of said wire and spaced from said pool, said high current pulse being terminated before about 60% of said arcing condition has transpired whereby said wire is melted by said high current pulse and said pool is again essentially quelled before said wire is fed into said pool whereby only said background current is flowing through the arc when said short circuit condition is initiated by driving said electrode into said pool.

28. The improvement as defined in claim 27, including a third current control circuit for controlling current flow during said short circuit condition, said third current control circuit including timing means for allowing flow of only said background current until said melted metal of said welding wire is primarily transferred into said molten pool by surface tension and means for thereafter applying a high current pinch pulse across said shorted melted metal and detector means for discontinuing said pinch pulse in response to an anticipation of impending breaking of said melted metal from said wire to start said arcing condition.

29. A method of short circuiting arc welding by a D.C. power supply for supplying welding current between a welding wire being fed at a controlled constant rate and the molten metal pool of workpiece toward which said wire is being fed, said method including a succession of short circuit conditions separated by arcing conditions, said method comprising the steps of:
   (a) providing a background current through said wire and pool during both of said short circuit conditions and said arcing conditions, said background current having a low level just above the level necessary for sustaining an arc when said wire and pool are separated;
   (b) at the start of each of said arcing conditions, allowing said low background current to flow for a preselected time $T_2$ sufficient to allow said molten pool to be quelled;
   (c) after said pool is quelled, passing a high current pulse through said arc between said wire and said pool with a preselected I(t) area for melting a relatively constant volume of metal on the end of said wire and spaced from said pool;
   (d) allowing said low background current to flow after said high current pulse for the remainder of said arcing condition; and,
   (e) then feeding said wire with said volume of melted metal on its end into said molten metal pool to start the short circuit condition with an arc sustained by only said low background current.

30. The method as defined in claim 29, including the step of maintaining said background current at all times.

31. The method as defined in claim 29, including the step of predicting the separation of said melted metal from said welding wire at the end of said short circuit condition.

32. In a short circuiting arc welding apparatus comprising a single constant voltage D.C. power supply means for causing a welding current to pass through a welding wire to a workpiece at a molten metal pool, wire feeding means for feeding said welding wire toward said workpiece at a controlled rate whereby said welding wire alternates between an arcing condition during which said wire is spaced from said pool of said workpiece but driven toward said pool and a short circuit condition during which melted metal on the end of said welding wire is in contact with said molten metal pool and then transfers to said workpiece by a necking action breaking said melted metal from said wire to initiate the arc in a subsequent arcing condition, the improvement comprising: a first current control circuit for continuously directing a low level, arc sustaining, background current between said welding wire and said workpiece and a metal transfer current control circuit for controlling current flow during said short circuit condition, said metal transfer current control circuit including timing means for allowing only said background current to flow until said metal metal of said welding wire is primarily transferred into said molten pool by surface tension, means for thereafter allowing a high current pinch pulse to flow across said shorted melted metal, detector means for discontinuing said pinch pulse current in response to an anticipation of impending breaking of said melted metal from said wire to start said arcing condition, means for thereafter passing a high energy current pulse between said wire and said pool during a first portion of said arcing condition and means for causing only said background current to flow during the remainder portion of said arcing condition.

33. In a short circuiting arc welding apparatus comprising a single constant voltage D.C. power supply means for causing a welding current to pass through a welding wire to a workpiece at a molten metal pool, wire feeding means for feeding said welding wire toward said workpiece at a controlled rate whereby said welding wire alternates between an arcing condition during which said wire is spaced from said pool of said workpiece but driven toward said pool and a short circuit condition during which melted metal on the end of said welding wire is in contact with said molten metal pool and then transfers to said workpiece by a necking action breaking said melted metal from said wire to initiate the arc in a subsequent arcing condition, the improvement comprising: a first current control circuit for continuously directing a low level, arc sustaining, background current in the range of about 20–80 amperes between said welding wire and said workpiece during both of said short circuit and arcing conditions, a second current control circuit for controlling current flow above said background current level during said arcing condition, and a third current control circuit for controlling current above said background current level during said short circuit condition.

34. In a short circuiting arc welding apparatus comprising a single constant voltage D.,C. power supply means for causing a welding current to pass through a welding wire of a given diameter to a workpiece at a molten metal pool, wire feeding means for feeding said welding wire toward said workpiece at a controlled rate whereby said welding wire alternates between an arcing condition during which said wire is spaced from said pool of said workpiece but driven toward said pool and a short circuit condition during which melted metal on the end of said welding wire is in contact with said molten metal pool and then transfers to said workpiece by a necking action breaking said melted metal from said wire to initiate the arc in a subsequent arcing condition, the improvement comprising: a first current control circuit for continuously directing a low level, arc sustaining, background current between said welding wire and said workpiece and a second current control circuit for controlling current flow during said arcing condition, said second control circuit including time delay means for causing said initiated arc to have current level determined by said background current for a preselected time $T_2$ during which melted metal on the welding wire and the molten metal pool are essentially quelled and means for then passing a high current pulse through said arc between said wire and pool with a preselected energy for melting a relatively constant volume of metal on the end of said wire and spaced from said pool, said volume being sufficient to form a sphere having a diameter no more than twice the diameter of said wire.

* * * * *

UNITED STATES PATENT AND TRADEMARK OFFICE
CERTIFICATE OF CORRECTION

PATENT NO. : 4,897,523

DATED : January 30, 1990

INVENTOR(S) : John M. Parks; Elliott K. Stava

It is certified that error appears in the above-identified patent and that said Letters Patent is hereby corrected as shown below:

Column 11, line 30, "12" should read --- 226 ---. Column 12, line 32, "FIG. 2" should read --- FIG. 1 ---; line 35, "306" should read --- 304 ---; line 58, "cause" should read --- causes ---. Column 14, line 59, "to" should read --- so ---. Claim 26, line 16, "direction" should read --- directing --- Claim 32, line 22, "metal" (first occurrence) should read --- melted ---. Claim 34, line 2, "D.,C." should read D.C. ---.

Signed and Sealed this

Twenty-first Day of January, 1992

Attest:

HARRY F. MANBECK, JR.

*Attesting Officer*      *Commissioner of Patents and Trademarks*